Oct. 13, 1970  KIYOSHI ITAKURA ETAL  3,533,772
APPARATUS FOR STRETCHING MOLTEN SHEET GLASS LATERALLY
Original Filed Feb. 28, 1966  4 Sheets-Sheet 1

INVENTORS
KIYOSHI ITAKURA
HIDEAKI TAKIGAWA

BY *Wenderoth, Lind & Ponack*
ATTORNEYS

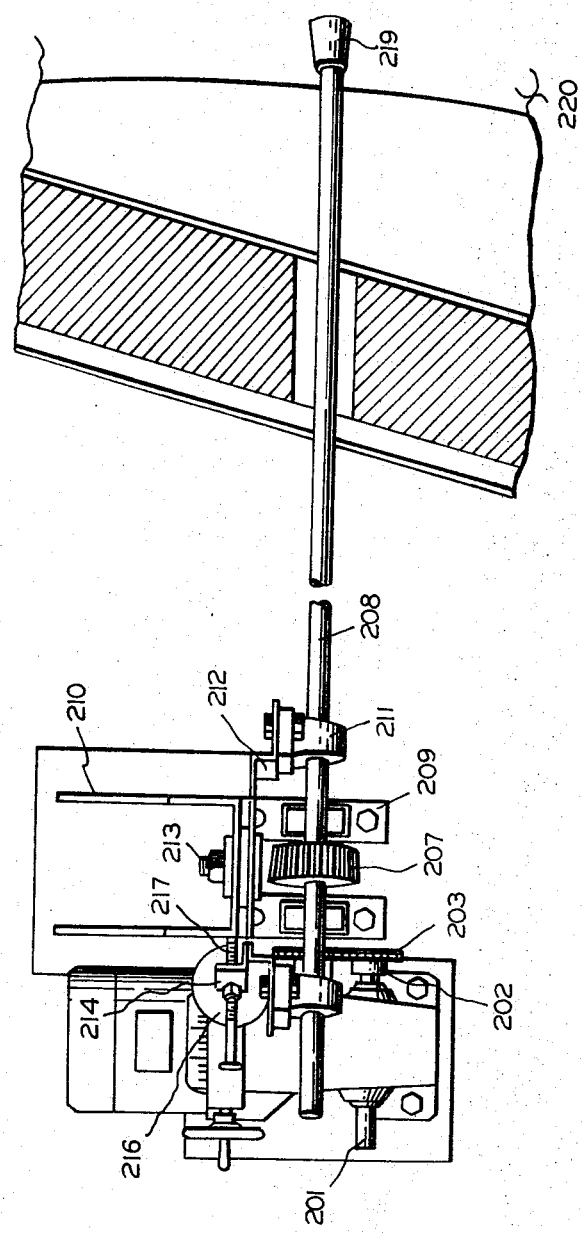

United States Patent Office 3,533,772
Patented Oct. 13, 1970

3,533,772
APPARATUS FOR STRETCHING MOLTEN
SHEET GLASS LATERALLY
Kiyoshi Itakura and Hideaki Takigawa, Higashinada-ku,
Kobe, Japan, assignors to Nippon Sheet Glass Co., Ltd.,
Higashi-ku, Osaka, Japan
Original application Feb. 28, 1966, Ser. No. 530,662, now
Patent No. 3,450,518, dated June 17, 1969. Divided and
this application Dec. 3, 1968, Ser. No. 780,726
Int. Cl. C03b 15/02
U.S. Cl. 65—182                            9 Claims

ABSTRACT OF THE DISCLOSURE

An apparatus for manufacturing sheet glass by stretching molten sheet glass laterally on the surface of a bath of molten metal. The sheet of molten glass delivered to the surface of the molten metal bath in a continuous ribbon and forwarded along the surface of the bath is grasped from both sides of the molten metal bath by grasping means which positively extend the width of the glass to a width greater than if the glass were allowed to flow under the effect of gravity. The grasping means can be cone-shaped members which rotate around their axes as they engage the edges of the ribbon of glass.

---

This application is a division of application Ser. No. 530,662, now Pat. No. 3,450,518, filed Feb. 28, 1966.

This invention concerns the manufacture of sheet glass, and particularly relates to the manufacture of thin sheet glass by a continuous sheet glass making method using a bath of molten metal.

It has hitherto been difficult to produce relatively thin sheet glass by such a method. When a glass ribbon of a certain definite thickness is manufactured by causing molten glass to flow freely on a bath of molten metal and spread in a thin layer, there is a limit to the thickness of the drawn glass owing to the temperature of the molten metal bath and molten glass and the surface tension thereof, and it is no easy task to get a thin glass sheet.

It has now been found that in the manufacture of sheet glass by feeding molten glass continuously from a glass melting furnace onto a bath of molten metal at a controlled rate and forming a layer of the molten glass into a continuous ribbon while floating it on the said bath, if the width of the ribbon of molten glass is positively enlarged by exerting an outwardly directed mechanical force simultaneously on both side edge portions of the molten glass ribbon, a thinner sheet glass of good quality can be obtained. It has also been found that the thin sheet glass obtained in accordance with this invention is superior in that it has less distortions than the product obtained by the prior art.

In the practice of the method of this invention, there is provided on both sides of the said molten bath at least one pair of stretching means which act on the side edge portions of the said glass ribbon and thus enlarge the width thereof positively while the molten glass ribbon is moving forward on the bath of molten metal and the glass is still capable of being deformed.

According to one feature of the invention, the stretching means comprises a cone-shaped stretching member (also to be referred to as a "rotary member"), which is capable of rotating around its axis while contacting the upper or lower face of one side edge portion of the molten glass ribbon, and during rotation, capable of exerting on the glass ribbon a pulling force at least directed outwardly of the ribbon, and a means for giving the said stretching member a rotary motion around its axis.

The cone-shaped rotary member to be rotated in contact with the lower face of the glass ribbon has a greater peripheral speed at a portion nearer the center of the ribbon, and because of this, the glass ribbon is enlarged in the widthwise direction and spread by the rotation of the rotary member. The use of a plurality of rotary members results in an overall extension of the width of the glass ribbon. The driving means which drives the rotary member is provided beside the bath of molten metal. The speed of rotation of the rotary member can be varied according to the speed at which the glass ribbon moves. Rotary members are arranged at certain intervals, and the sidewise pulling force of the rotary members is adjusted so that it is equal at both sides and does not cause the glass ribbon to move in zigzag fashion. Thus, the glass ribbon is drawn as it is conveyed on the bath of molten metal, and is then cooled and congealed.

The said rotary members can be used at the edge portions of the upper surface of both sides of the glass ribbon. If necessity requires, the rotary members can be used on both the upper surface and the lower surface.

The peripheral speed of the rotary member differs from the tip portion to the root portion as it has a cone-shape. For this reason, the drawing of the glass ribbon can be carried out more expeditiously as compared with drawing using a cylindrical rotary member.

The invention will now be described with reference to the accompanying drawings, in which:

FIG. 5 is a top plan view of the apparatus of FIG. 3; and

Figure 1:
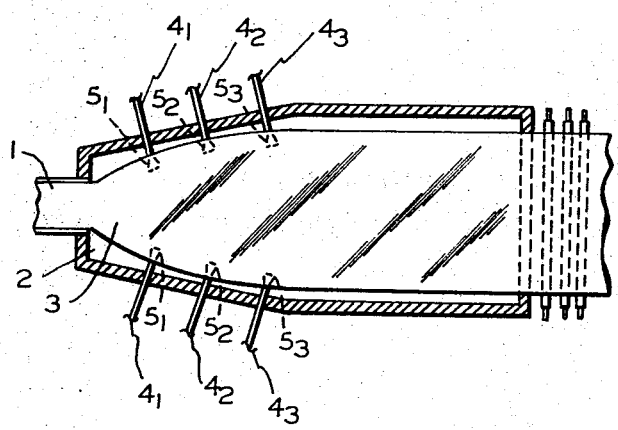
FIG. 1 is a diagrammatic plan view showing the method of the invention wherein a stretching means comprising rotary members is used.

In FIG. 1, the molten glass in a glass melting furnace is poured onto a molten metal bath 2 through a passage 1 at a controlled rate. The molten glass spreads naturally over the bath of molten metal in a fluid state and constitutes a glass ribbon 3, which goes forward afloat on the surface of the bath.

Figure 2:
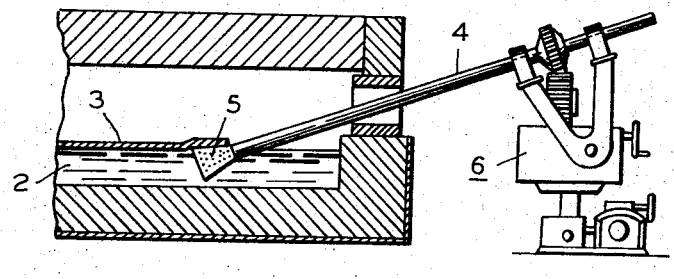
FIG. 2 is a side view for illustrating the action of stretching means comprising rotary members.

A first rotary member $5_1$ catches the under face of edge portions at both sides of the glass ribbon, exerts an outward pulling force and draws the glass ribbon. The position of the rotary member in action is shown in FIG. 2. To the tip of a shaft 4 extending in from the upper side wall of the bath tube is secured a cone-shaped rotary member 5 which supports the under face of the edge portion of the glass ribbon 3. A driving means 6 causes the rotary shaft 4 to rotate and the rotary member rotates in a direction such that it moves the glass ribbon forwards. Because of the cone-shape of the rotary member, the peripheral speed of the rotary member differs from the tip portion to the root portion. In other words, a portion of the glass ribbon which comes in contact with the tip portion of the rotary member 5 has a relatively great speed, and the speed gets lower at a portion farther therefrom. The ribbon extended and spread by the first rotary member $5_1$ is then spread by a second rotary member $5_2$, and subsequently by a third rotary member $5_3$. The number of rotary members and the speed of rotation thereof per unit time are determined depending upon the desired thickness and width of the final product. For the rotary member, a refractory material which does not react with the molten metal (e.g., tin) at high temperatures is used. It is desirable that the rotary member be provided with projections on its surface so that the molten glass does not undergo slippage. When the rotary shaft 4 extends in a direction inclined at an angle of about 15° to the molten metal bath, the width of the glass sheet can be more effectively extended.

The rotary member can effect a continuous and stable extension, but its use at a glass ribbon temperature above about 1050° C. is not desirable.

Figure 3:
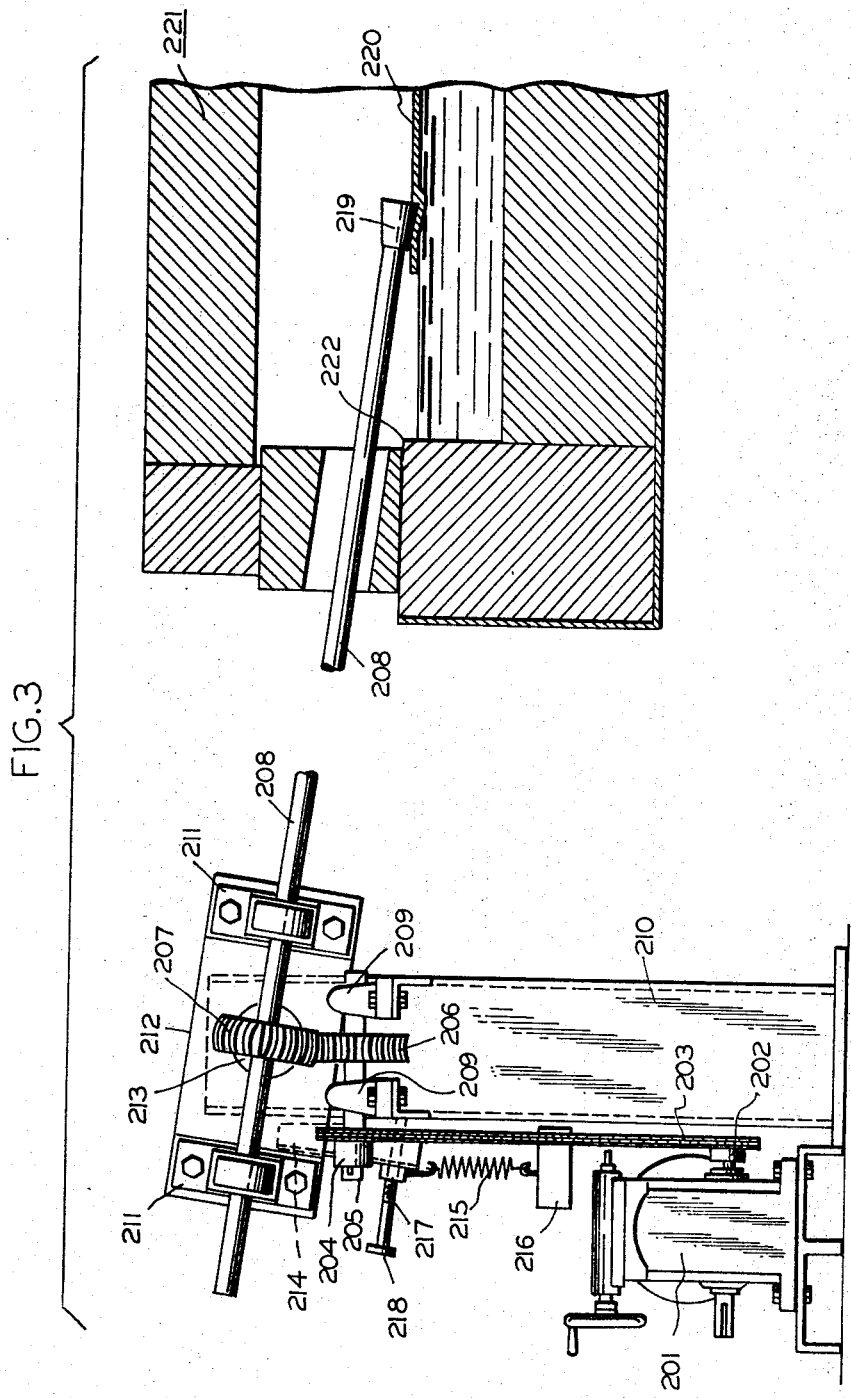
FIG. 3 is a side view partly in section of the stretching means comprising rotary members and taken along a transverse section of the bath.
Figure 4:
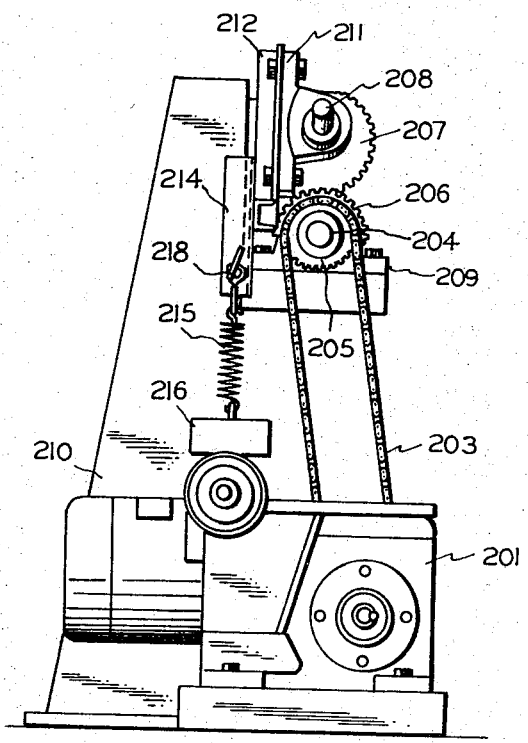
FIG. 4 is a front view of the apparatus taken from the left of FIG. 3.

FIGS. 3–5 show one example of a stretching means comprising rotary members.

Figure 6B:
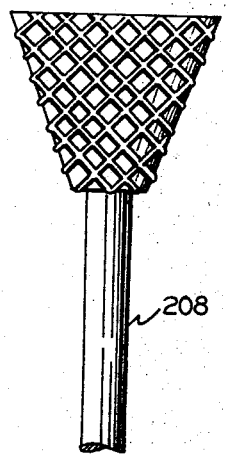
FIGS. 6a and 6b show examples of rotary members suited for use in this invention.
Figure 6A:
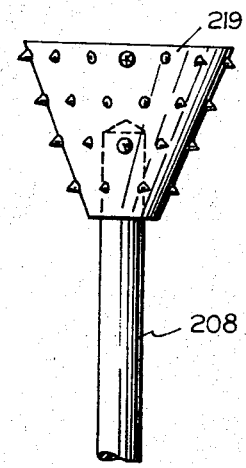

The rotating force of a geared motor 201 is transmitted to an intermediate shaft 205 by chain wheels 202 and 204 and a chain 203. The gear 206 affixed to the intermediate shaft 205 engages a gear 207 secured to a cone shaft 208, and by this the rotation of the intermediate shaft 205 is transmitted to the cone shaft 208. Gears 206 and 207 are designed so that they can engage each other even if the angle between the intermediate shaft 205 and the cone shaft 208 changes, so long as the distance from center to center of these two gears does not vary. The intermediate shaft 205 is mounted on a stand 210 or bearings 209, and the cone shaft 206 is mounted on a rotary stand 212 on bearings 211. The rotary stand 212 is rotatably mounted on the stand 210 by a pin 213 or in a manner such that even if it rotates, the distance from the center of gear 206 to that of gear 207 does not vary. Thus, the rotation of the motor 201 is transmitted to the cone shaft 208. To the rotary stand 212 is affixed a bracket 214 from which a weight 216 is hung by means of a spring 215. A jack bolt 217 mounted on the bracket 214 contacts the stand 210 at its tip, and controls the rotation of the rotary stand 212 around the pin 213. When a handle 218 of the jack bolt is rotated, the jack bolt 217 either goes forward or backward. By this means it is possible to change the inclination of the rotary stand 212 and that of cone shaft 208. The rotation of the cone shaft is transmitted to a cone 219 situated at its end. The cone 219 expands the glass ribbon in the direction of a side wall 222 of a bath tube 221 when the cone 219 is rotated while being pushed against one side edge portion of the glass ribbon 220. Preferred cones, as shown in FIGS. 6a and 6b, have small projections on their surfaces. The cone 219 is first inserted into the bath tube 221 so that it is at an appropriate position above one side edge portion of the glass ribbon 220. Thereafter, the rotary stand 212 is rotated by the jack bolt 217, and by this action the cone 219 is gradually lowered and pushed against the glass ribbon 220.

The cone member can be manufactured of refractory material such as boron nitride, silicon nitride, graphite and the like. When internal cooling is carried out, it is found that a material made by calorising the surface of a mild steel is desirable.

What is claimed is:

1. In an apparatus for manufacturing sheet glass including a bath of molten metal for receiving on the surface thereof molten glass delivered from a glass melting furnace at a controlled rate and forming it into a continuous ribbon while conveying it downstream therefrom over the surface of the molten metal, and at least one spaced pair of means on both sides of said molten bath toward the end adjacent said furnace for engaging the side edge portion of the said glass ribbon and positively extending its width while the glass ribbon flows progressing longitudinally forward on the bath and is in a deformable state, the improvement wherein:

(a) each pair of the said means comprises a generally cone-shaped stretching member rotatable around its axis, and means for positioning same at the level of the surface of the molten metal bath;
   (b) said member having a glass-contacting side surface and a generally noncontacting end surface, and being disposed such that the axis thereof extends in a generally transverse direction crossing into the length of the glass ribbon flowing upon said bath, with the side surfaces thereof rotatingly contacting a surface of the laterally opposite edge portions of the glass ribbon by and during rotation of said members;
   (c) and said cone members disposed with their smaller, converging end portions confronting toward the laterally outermost sides of the glass ribbon and the larger diverging portions confronting toward the middle and inner side of the glass ribbon,
   (d) said cones rotating in a direction so that opposite side pairs apply to the glass ribbon an outwardly directed mechanical force to pull opposite, lateral sides of the glass ribbon at least in the direction of its width; and
   (e) a driving means coupled to said stretching member for rotating the stretching member around its axis.

2. Apparatus of the character described in claim 1 wherein said width-extending means include a plurality of three of said cone members provided oppositely on each side of said bath with the center one of each plurality being common to forming two pair of said cone-shaped stretching members and which are disposed separately from each other progressively downstream along the longitudinal direction of said bath engaging in each side edge portion of the glass ribbon; and those members which are positioned progressively downstream from the others being disposed in progressively greater lateral apart spacing than those members which are positioned upstream, and said members which are positioned progressively further apart downstream being capable of still contacting said surface of the opposite lateral edge portions of the glass ribbon whose width has been initially extended by said upstream-positioned members.

3. Apparatus of the character as described in claim 1 wherein said stretching member is disposed so that its axial direction running from a smaller tip portion thereof to a larger root portion is inclined approximately 15° toward the downstream of the bath from a line directed 90° vertical to the longitudinal flow direction of said glass ribbon on the bath.

4. Apparatus of the character described in claim 1, wherein said driving means comprises a long rigid motion transmitting rod member for and to one end of which each of said cone-shaped stretching members is affixed, and said driving means for generating a rotating force provided outside said bath and operatively connected with the other ends of said rod members so as to give a rotating force to said stretching members through said rod member in such a direction that the side surface of said stretching member is allowed to move in the direction of advance of the glass ribbon.

5. Apparatus as defined in claim 4 wherein said cone-shape members are disposed so that the uppermost portion of said side surface and a plane tangent thereto are disposed horizontally with respect to the surface of said molten metal bath and glass ribbon thereon.

6. Apparatus as defined in claim 5 wherein the side surface of said cone-shaped members engage the uppermost or top surface of said glass ribbon.

7. Apparatus as defined in claim 5 wherein the side surface of said cone-shaped members engage the lowermost or under surface of said glass ribbon.

8. The apparatus described in claim 1 wherein each of the said stretching members has a plurality of small radial projections on its cone-shaped surface.

9. Apparatus as defined in claim 1, wherein said cone-shaped members are made of a refractory material selected from the group including materials such as boron nitride, silicon nitride, and graphite.

References Cited
UNITED STATES PATENTS

| | | | |
|---|---|---|---|
| 1,586,618 | 6/1926 | Ferngren | 65—199 |
| 1,761,234 | 6/1930 | Crowley | 65—91 |
| 3,222,154 | 12/1965 | Pilkington | 65—91 |

S. LEON BASHORE, Primary Examiner

J. H. HARMAN, Assistant Examiner

U.S. Cl. X.R.

65—91, 199, 200